United States Patent Office 3,686,147
Patented Aug. 22, 1972

3,686,147
SULFUR-VULCANIZABLE POLYURETHANES HAVING MULTIPLE TERMINAL ALLYL GROUPS
Jean-Marie Massoubre, Clermont-Ferrand, France, assignor to Compagnie Generale des Etablissements Michelin, raison sociale Michelin & Cie, Clermont-Ferrand, France
No Drawing. Filed Oct. 15, 1970, Ser. No. 81,170
Claims priority, application France, Oct. 27, 1969, 6936838
Int. Cl. C08g 22/16
U.S. Cl. 260—75 NP      13 Claims

ABSTRACT OF THE DISCLOSURE

Each end of the chain of a sulfur-vulcanizable unsaturated polyurethane has at least three and preferably four ethylene double bonds.

BACKGROUND OF THE INVENTION

This invention relates to elastomers and, more particularly, to elastomers of the sulfur-vulcanizable polyurethane type having new structural characteristics and possessing, because of their special structure, definitely improved properties as compared with those of the known sulfur-vulcanizable polyurethanes. It also relates to the manufacture of these new polyurethanes and to new compounds that are used in their production.

For a polyurethane to be vulcanizable by sulfur, it is necessary that it be unsaturated and have a sufficient density of ethylene unsaturations—a density far greater than that found in the polyurethanes that are vulcanizable only by peroxides. This density is at least one unsaturation for every 8,000 units of molecular weight, and preferably for every 5,000 units of molecular weight.

Unsaturated polyurethanes are vulcanized less easily with sulfur than with peroxides, and the vulcanized products have generally better properties in the case of vulcanization with peroxides than in the case of vulcanization with sulfur. However, vulcanization with sulfur is more convenient. In particular, a sulfur-vulcanizable polyurethane can be worked with the same equipment as that used to work elastomers traditionally vulcanized with sulfur. Also, a polyurethane vulcanized with sulfur can be used in contact with any other sulfur-vulcanized elastomer, even at elevated temperature. This is not true of the polyurethanes that are vulcanizable or vulcanized with peroxides; the working of such polyurethanes requires elaborate precautions, and restrictions and limitations as to use; must be imposed in order to avoid any contact with sulfur, sulfur products or sulfur-vulcanized elastomers.

Attempts have been made to reduce the drawbacks of sulfur-vulcanizable polyurethanes and in particular to improve their vulcanization kinetics and the properties of their vulcanized products. Substantial improvements can be obtained by the means described in French Pats. Nos. 1,484,729 and 1,486,448. These patents describe polyurethanes having a density of ethylene unsaturations that permits sulfur vulcanization and furthermore having one or two ethylene unsaturations at each end of the chain. French Pat. No. 1,486,448 furthermore discloses that it is advantageous to prevent undue concentrations of the ethylene unsaturations (for instance, groups of two or four), a random distribution being preferable.

SUMMARY OF THE INVENTION

An object of the present invention is to remedy the problems outlined above and, more particularly, to improve the properties of sulfur-vulcanizable polyurethanes.

The foregoing and other objects are attained in accordance with the invention by the provision of a sulfur-vulcanizable unsaturated polyurethane characterized in that at each end of the chain it has at least three and preferably four ethylene double bonds.

In a preferred embodiment of the invention, the terminal ethylene double bonds are partially or totally connected to tertiary nitrogen atoms or are in the vicinity of tertiary nitrogen atoms.

As has been pointed out, it is in general disadvantageous to concentrate ethylene double bonds in the same region of the chain. As can readily be imagined, ethylene double bonds that are close together are much less reactive than ethylene double bonds that are remote from each other. It is therefore surprising that an increase in the number of terminal ethylene double bonds should lead to an improvement in the properties of the vulcanized products. Such improvement, however, has been verified by experience.

Furthermore, it has been discovered that by using ethylene double bonds partially or totally connected to tertiary nitrogen atoms or in the vicinity of tertiary nitrogen atoms, one substantially improves the sulfur vulcanization kinetics.

In order to obtain a polyurethane in accordance with the invention, one reacts together or in succession the following:

(a) One employs $p$ moles of one or more compounds having two functions reactive with isocyanates and having together $q$ ethylene unsaturations. The compounds are selected from the group consisting of unsaturated dihydroxy polymers, saturated dihydroxy polymers and saturated or unsaturated compounds of low molecular weight having two functions reactive with isocyanates, preferably two alcohol functions, with the proviso that the compounds selected cannot all be saturated compounds.

(b) One employs 2 moles of a compound having a single function reactive with isocyanates, preferably an alcohol function, and having at least three and preferably four ethylene double bonds.

(c) One employs $p+1$ moles of an organic diisocyanate. The number $p$ is selected an a function of the molecular weight of the reactants used, in such a manner that the addition product of the above reactants, i.e., unsaturated polyurethane, has a molecular weight $W$ of between 40,000 and 100,000, the number $q$ being selected in such a manner that the density or interval between intermediate ethylenic unsaturations $W/q$ is between 1,700 and 8,000, and preferably between 3,000 and 6,000, molecular weight units.

By "dihydroxy polymer" there are understood the polyesters, polyethers, polyester amides and polyester ethers used customarily in the preparation of polyurethanes, of a molecular weight of generally between 1,500 and 3,500.

Among the unsaturated compounds of low molecular weight that are bifunctional with respect to isocyanates, one may select in particular allyloxy-2-propanediol-1,3; monoallyl ether of trimethylol propane; allyl diether of pentaerythritol; N-allyldiethanolamine; monoallyl ether of triethanolamine; the reaction product of allyl glycidyl ether with N-methyl ethanolamine; allyl-2-propanediol-1,3; the allyl, methallyl or vinyl ethers of diaminophenols; cyclohexene-3-dimethanol-1,1; methyl-4-cyclohexene-3-dimethanol-1,1; hexadiene-1,5-diol-3,4; pentene-1-diol-3,4; octadiene-2,6-diol-4,5; the allyl thioethers, such as thioallyl propane diol; etc.

Among the saturated compounds of low molecular weight that are bifunctional with respect to isocyanates, one may mention the saturated diols, diamines or amino alcohols such as ethylene glycol, propylene glycol, diethylene and triethylene glycol, the butane diols, pentane diol, hexane diol, neopentyl glycol, ethanolamine, hexamethylene diamine, dichlorobenzidine and methylene-bis (ortho-chloroaniline).

Among the compounds monofunctional with respect to isocyanates and which have at least three and preferably four ethylene double bonds, mention may be made of the products derived from polyols (tetrols, pentols, hexols) in which all the hydroxyl functions except one have been etherified by an unsaturated compound, for instance triallyloxy pentaerythritol, triallyloxy hexane tetrol, tetra-allyloxy arabitol and penta-allyloxy dulcitol.

Among the compounds monofunctional with respect to isocyanates which have three or four double bonds partially or totally connected to tertiary nitrogen atoms or in the vicinity of tertiary nitrogen atoms, mention may be made of the reaction products of diallylamine with unsaturated epoxy compounds and/or with halogenated unsaturated alcohols. Among the latter, mention may be made of diallylamino-1-allyloxy-3-propanol-2 and bis(diallylamino)-1,3-propanol-2. These are new compounds of the invention, the method of preparation of which as well as the properties of which permitting their identification will be indicated further below in detail in the examples.

All the organic diisocyanates may be used, for example, 3,3' - dimethyl-4,4'-diphenylene diisocyanate, 4,4'-diphenylmethane diisocyanate, 2,4-toluene or 2,6-toluene diisocyanate (or a mixture of the two), naphthylene diisocyanate, para-phenylene diisocyanate, hexamethylene diisocyanate, etc.

The polyurethanes in accordance with the invention can be vulcanized by means of a vulcanizing system comprising, per 100 parts by weight of polyurethane, 1 to 3 parts of sulfur, 1 to 3 parts of mercaptobenzothiazole, 2 to 6 parts of mercaptobenzothiazole disulfide and 0.3 to 1 part of metallic activators comprising complexes of zinc halides and mercaptobenzothiazole, possibly associated with cadmium stearate. At a temperature of about 155° C., the vulcanization time is about 30 minutes in the event that the polyurethanes do not have any terminal ethylene double bonds connected to nitrogen atoms; it is between 10 and 20 minutes when terminal ethylene double bonds connected to nitrogen atoms are used. In this latter case, one can also effect the vulcanization at a relatively low temperature (135° C. for instance) in a period of time which is still acceptable.

DESCRIPTION OF THE PREFERRED EMBODIMENTS

The invention is illustrated by the following examples which indicate in non-limitative fashion how it can be carried out.

EXAMPLE I

This example relates to a polyurethane having at each end of the chain three ethylene double bonds forming part of radicals of the allyloxy-type connected to the same carbon atom.

To 10 kg. of mixed ethylene glycol and propylene glycol polyadipate of a molecular weight of 2780 there are added:

293 g. of allyloxypropanediol;
76 g. of triallyloxy pentaerythritol, i.e., $$(CH_2=CH-CH_2-O-CH_2)_3CCH_2OH$$

1490 g. of diphenylmethane diisocyanate.

After homogenization and heating in an oven for two hours at 120° C. and aging for five days at 60° C., there is obtained a polyurethane of a molecular weight close to 80,000 of a Mooney ML (1+4) plasticity at 100° C. of 65. This polyurethane has three ethylene double bonds at each end of the chain and within the chain one double bond for every 5,000 units of molecular weight. The molar proportions correspond approximately to 24 moles of polyester, 15 moles of allyloxypropanediol, 2 moles of triallyloxy pentaerythritol and 40 moles of diisocyanate. The polyurethane of the invention obtained is designated Polyurethane A.

Another control polyurethane, designated Polyurethane B, is prepared under identical conditions, except that instead of the trialloxy pentaerythritol, the equivalent quantity, namely 50.9 g., of diallyloxypropanol is used. The Polyurethane B has substantially the same molecular weight and the same number of double bond unsaturations within the chain as the Polyurethane A, but it has only two double bonds at each end of the chain. Its Mooney plastictiy is 55.

Polyurethanes A and B serve as basis for vulcanizable mixtures I and II in accordance with the following formulae (by weight).

|  | I | II |
|---|---|---|
| Polyurethane A or B | 100 | 100 |
| Stearic acid | 0.3 | 0.3 |
| SAF black | 25 | 20 |
| MBTS | 3.4 | 1 |
| MBT | 1.7 | 1.5 |
| MBZ | 0.3 | 0.3 |
| Sulfur | 1.7 | 1.5 |
| Cadmium stearate | 0.5 | 0 |

NOTE.—MBTS=mercaptobenzothiazole disulfide, MBT=mercaptobenzothiazole, MBZ=complex of mercaptobenzothiazole disulfide and zinc bromide.

After vulcanization at 154° C. for 30 minutes, the following properties are observed.

|  | IA | IB | IIA | IIB |
|---|---|---|---|---|
| Modulus (at 100% elongation) kg./cm.² | 29.2 | 26.4 | 17.5 | 14.3 |
| Hysteresis loss at 20° C., percent | 34.8 | 38 | 29.2 | 37.6 |
| Elongation at rupture at 20° C., percent | 606 | 617 | 760 | 767 |
| Rupture force at 20° C., kg./cm.² | 390 | 390 | 439 | 404 |
| Eolngation at rupture at 100° C., percent | 635 | 578 | 826 | 825 |
| Rupture force at 100° C., kg./cm.² | 195 | 157 | 197 | 163 |
| Compression set: |  |  |  |  |
| 24 hours at 20° C | 10.6 | 10.8 | 11.7 | 13.5 |
| 24 hours at 100° C | 52.2 | 61.7 | 63 | 71.4 |
| 72 hours at 100° C | 70.2 | 78.2 | 77 | 85.2 |
| Yerzley: |  |  |  |  |
| Resilience | 75.8 | 70.5 | 76.6 | 73 |
| Deformation | 1.96 | 3.15 | 2.32 | 3,34 |
| Flexometer: |  |  |  |  |
| Initial compression | 14.4 | 15.4 |  |  |
| Heating in ° C | 36 | 39 |  |  |
| Permanent deformation | 1.8 | 3.7 |  |  |

As can be seen, vulcanizates IA and IIA have marked superiority over control vulcanizates IB and IIB: the presence of three terminal double bonds as in Polyurethane A of the invention instead of two terminal double bonds as in control Polyurethane B produces a considerable, unexpected improvement in the physical properties of the vulcanizates.

It is easy to see that the advantage obtained is related to the sulfur vulcanization and that two peroxide-vulcanizable and vulcanized polyurethanes, one having two terminal double bonds and the other three, do not have as marked differences in physical properties, as is shown by the following experiment.

Two comparative Polyurethanes A' and B' are prepared in a manner similar to that described above from:

10 kg. of mixed ethylene glycol and propylene glycol polyadipate of a molecular weight of 2,800;
55.1 g. of allyloxypropanediol;
either 71.3 g. of triallyloxy pentaerythritol (Polyurethane A') or 47.9 g. of diallyloxypropanol (Polyurethane B');
1,020 g. of diphenylmethane diisocyanate.

There are obtained two polyurethanes of a Mooney ML (1+4) plasticity at 100° C. of 49–50, having in each chain a small number of intermediate double bonds (on the average three) and having at each end of the chain three double bonds in the case of Polyurethane A' and two in the case of Polyurethane B'.

Vulcanizable mixtures are prepared having the following formula by weight:

| | |
|---|---|
| Polyurethane (A' or B') | 100 |
| Stearic acid | 0.3 |
| SAF black | 25 |
| Di-Cup 40 (40% dicumyl peroxide) | 5 |

After vulcanization at 154° C. for 30 minutes, the following properties are observed.

| | A' | B' |
|---|---|---|
| Modulus (at 100% elongation) kg./cm.² | 27.5 | 28.3 |
| Hysteresis loss, percent: | | |
| At 20° C | 18 | 16.8 |
| At 60° C | 14 | 12.4 |
| Elongation at rupture at 20° C., percent | 440 | 433 |
| Elongation at rupture at 100° C., percent | 263 | 250 |
| Rupture force (kg./cm.²) at 100° C | 125 | 115 |
| Compression set: | | |
| 24 hours at 20° C | 1.8 | 1.7 |
| 24 hours at 100° C | 7 | 7.8 |
| 72 hours at 100° C | 18.4 | 17 |
| Flexometer: | | |
| Initial compression | 14.3 | 13.7 |
| Heating in ° C | 25 | 23 |
| Permanent deformation | 0.4 | 0.5 |

The physical properties of the two peroxide-vulcanizates of comparative Polyurethanes A' and B' are practically identical, while those of the sulfur-vulcanizates of Polyurethane A of the invention and control Polyurethane B are very different.

EXAMPLE II

This example relates to polyurethanes having at each end of the chain three ethylene double bonds, two thereof connected to a tertiary nitrogen atom via a small number of carbon atoms.

In the present example the three terminal double bonds are introduced into the polyurethane molecule by means of diallylamino-1-allyloxy-3-propanol-2, a new compound of the formula:

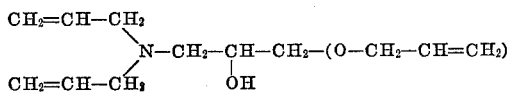

There will first be indicated the manners in which this new compound can be obtained.

Preparation from allyl glycidyl ether

An equimolecular mixture of diallylamine and allyl glycidyl ether dissolved in acetone or methyl ethyl ketone is maintained at the boiling point for 12 hours in the presence of a catalytic amount of tertiary amines. At the end of 12 hours, after cooling and evaporation of the solvent, vacuum distillation is effected. The desired product is obtained in a yield of 87%. Thus, 291 g. (3 moles) of diallylamine and 342 g. (3 moles) of allyl glycidyl ether in 200 cc. of methyl ethyl ketone in the presence of 2 g. of DABCO (diazabicyclo-octane) give, upon distillation, 550 g. of diallylamino - 1 - allyloxy-3-propanol-2.

The boiling point is measured under a pressure of 0.1 mm. of mercury, as well as the index of refraction for the D line of sodium at 25° C. One finds:

$$B.P._{0.1} = 65-66° C., n_D^{25} = 1.4682$$

The percentage chemical analysis is as follows:

| | Calculated | Measured |
|---|---|---|
| C | 68.2 | 67.96 |
| H | 10 | 10.17 |
| N | 6.63 | 6.78 |

Preparation from allyloxy-1-chloro-3-propanol-2

An equimolecular mixture of diallylamine and allyloxy-1-chloro-3-propanol-2 dissolved in an inert solvent, such as alcohol, is boiled under reflux for six hours. After cooling, the hydrochloride formed is liberated by the addition of the corresponding amount of soda or potash. After filtration of the salt formed and evaporation of the solvent, the reaction product is distilled. The yield is 68%.

Thus, 48.5 g. (0.5 mole) of diallylamine and 75 g. (0.5 mole) of allyloxy-1-chloro-3-propanol-2 in 150 cc. of ethyl alcohol are boiled for six hours. After addition of 20.5 g. of soda and filtration and evaporation of the solvent, there are obtained by vacuum distillation 72 g. of diallylamino-1-allyloxy-3-propanol-2.

The allyloxy-1-chloro-3-propanol-2 is obtained by reaction of allyl alcohol with epichlorhydrin. It can serve for the preparation of allyl glycidyl ether with a yield of 85%.

This second method of preparation, although giving a lower yield (68% as compared with $$\frac{85}{100} \times \frac{87}{100} = 74\%$$

in the case of the direct method), has the advantage of being faster. The purity of the products obtained is equivalent in both methods.

Preparation of the polyurethane

To 10 kg. of mixed ethylene glycol and propylene glycol polyadipate of a molecular weight of 2,850 there are added:

292.5 g. of allyloxypropanediol;
62.3 g. of diallylamino-1-allyloxy-3-propanol-2;
1,470 g. of diphenylmethane diisocyanate.

After homogenization and placing in an oven for 48 hours at 90° C., there is obtained a polyurethane having a molecular weight of about 80,000 and a Mooney ML (1+4) viscosity at 100° C. of 48. This polyurethane of the invention, designated Polyurethane C, has in its chain one intermediate ethylene unsaturation for every 5,000 units of molecular weight and at each end of the chain three double bonds, two of them connected to a nitrogen atom and being separated therefrom only by one carbon atom. The proportions indicated are equivalent to using about 24 moles of polyester, 15 moles of allyloxypropanediol, 2 moles of diallylamino-1-allyloxy-3-propanol-2 and 40 moles of diisocyanate.

In addition to the above Polyurethane C, a control Polyurethane D is prepared in identical fashion but replacing the diallylamino-1-allyloxy-3-propanol-2 by 50.8 g. of diallyloxypropanol, namely the equivalent molar quantity. There is obtained a polyurethane whose molecular weight, degree of double bond unsaturation and Mooney are identical, but which has only two terminal double bonds connected solely to carbon atoms at each end of the chain.

Preparation of the mixtures and vulcanization

The Polyurethanes C and D disclosed above are used to produce vulcanizable mixtures in accordance with the following Formula I (by weight).

| | |
|---|---|
| Polyurethane C or D | 100 |
| Stearic acid | 0.3 |
| SAF black | 25 |
| MBTS | 3.4 |
| MBT | 1.7 |
| MBZ | 0.3 |
| Sulfur | 1.7 |
| Cadmium stearate | 0.5 |

Mixture IC is vulcanized at 154° C. in only 20 minutes; mixture ID in 30 minutes at the same temperature.

Mixtures IIC and IID are also prepared in accordance with Formula II which differs from Formula I only by the elimination of the cadmium stearate. These mixtures are vulcanized at 140° C., mixture IIC in 35 minutes and mixture IID in 80 minutes.

Properties of the vulcanized products

The following table gives the properties of the vulcanized products

| | IC | ID | IIC | IID |
|---|---|---|---|---|
| Modulus (at 100% elongation) kg./cm.² | 28 | 28 | 28 | 29.6 |
| ISO hardness | 74 | 75 | 74 | 75 |
| Hysteresis loss in percent: | | | | |
| At 20° C | 33.9 | 36.8 | 31.8 | 33.8 |
| At 60° C | 27 | 28.4 | 26.6 | 26.6 |
| Elongation at rupture in percent at 20° C | 580 | 560 | 657 | 627 |
| Rupture force in kg./cm.² at 20° C | 346 | 344 | 387 | 372 |
| Elongation at rupture in percent at 100° C | 638 | 515 | 670 | 615 |
| Rupture force in kg./cm.² at 100° C | 207 | 143 | 224 | 197 |
| Flexometer: | | | | |
| Initial compression | 13.2 | 13.2 | | |
| Heating in ° C | 31 | 34 | | |
| Permanent deformation | 3.1 | 2.9 | | |

As is seen, the physical properties of the vulcanizates of Polyurethane C of the invention are definitely superior to those of the vulcanizates of control Polyurethane D, although the vulcanizable mixtures of the polyurethane of the invention have been vulcanized in a considerably shorter period of time.

EXAMPLE III

This example is similar to Example II and shows the manufacture of a polyurethane having three terminals double bonds at each end of the chain and prepared from an unsaturated polyester and not from a saturated polyester as in Example II.

A polyurethane in accordance with the invention, designated Polyurethane E, is prepared from an unsaturated mixed polyester of ethylene glycol, propylene glycol and allyloxypropanediol having a molecular weight of 2,610 and an unsaturation rate corresponding to one intermediate double bond every 4,320 units of molecular weight.

To 10 kg. of this unsaturated polyester there are added:

66.7 g. of diallylamino-1-allyloxy-3-propanol-2;
990 g. of diphenylmethane diisocyanate.

After homogenization and then placing in an oven for 24 hours at 120° C., and aging for 5 days at 60° C., there is obtained an unsaturated Polyurethane E of a molecular weight of about 70,000 and a Mooney ML (1+4) viscosity at 100° C., of 64. This Polyurethane E has three double bonds at each end of the chain, two of them connected and in the vicinity of one nitrogen atom.

A control Polyurethane F is prepared by proceeding in the same manner and with the same products, except that, instead of diallylamino-1-allyloxy - 3 - propanol-2, there is used an equivalent molar quantity, namely 54.3 g., of diallyloxypropanol. The control Polyurethane F has a structure which differs from that of the Polyurethane E in accordance with the invention only by the presence of two terminal double bonds at each end of the chain not connected to nitrogen atoms, instead of three terminal double bonds at each end of the chain, some of which are connected to and near nitrogen atoms.

With the polyurethanes thus obtained, vulcanizable mixtures are prepared using Formula I of Example II. The mixtures are then vulcanized at 154° C., the mixture utilizing Polyurethane E in 20 minutes and the mixture utilizing control Polyurethane F in 30 minutes, these times having been selected for the obtaining of optimum properties.

The following table gives the properties of the vulcanized products.

| | E | F |
|---|---|---|
| Modulus at 100% elongation kg./cm.² | 22.2 | 23.2 |
| ISO hardness | 69 | 70 |
| Hysteresis loss in percent: | | |
| At 20° C | 27.7 | 33 |
| At 100° C | 20.9 | 26 |
| Elongation at rupture in percent at 20° C | 637 | 607 |
| Rupture force in kg./cm.² at 20° C | 375 | 331 |
| Elongation at rupture in percent at 100° C | 626 | 511 |
| Rupture force in kg./cm.² at 100° C | 191 | 135 |
| Flexometer: | | |
| Initial compression | 14.4 | 14.1 |
| Heating in ° C | 29 | 31 |
| Permanent deformation | 2.8 | 2.6 |

In this example still, the Polyurethane E in accordance with the invention, although vulcanized in a much shorter time than the control Polyurethane F, has properties which as a whole are better. Furthermore, the Polyurethane E does not show any phenomenon of reversion when the period of exposure to heat is prolonged, which is not true when using accelerators of the metallic type (MBZ, cadmium stearate) in relatively large amount.

EXAMPLE IV

This example relates to a polyurethane having at each end of the chain four ethylene double bonds connected two by two to a tertiary nitrogen atom.

This particular structure is obtained by the use, for the preparation of the polyurethane, of bis(diallylamino)-1, 3-propanol-2, that is to say, of the new compound of the formula:

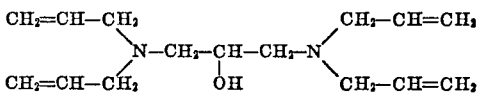

Preparation of bis(diallylamino)-1,3-propanol-2

In a first stage, an equimolecular mixture of diallylamine and epichlorhydrin is allowed to react at ordinary temperature for at least 48 hours. The reaction product is then distilled under vacuum, and is obtained in a yield of 81%. Thus, 291 g. (3 moles) of diallylamine and 279 g. (3 moles) of epichlorhydrin are mixed and set aside for 60 hours. By distillation there are obtained 460 g. of diallylamino-1-chloro-3-propanol-2, the boiling point of which, under a pressure of 0.07 mm. of mercury, and the index of refraction for the D line of sodium at 25° C. are:

$$B.P._{0.07}=56° C., n_D^{25}=1.4820$$

In a second stage, the chlorinated derivative obtained is treated in solution in ether at ordinary temperature and then under reflux either with an aqueous solution of soda or potash or with powdered soda or potash.

Thus, to 76 g. (0.4 mole) of diallylamino-1-chloro-3-propanol-2 dissolved in 100 cc. of ether there are added drop by drop at ordinary temperature 28 g. of potash dissolved in 40 cc. of water. When the addition is completed, it is reacted for two hours at room temperature, the mixture being strongly agitated, and then refluxed for three hours. After cooling, decantation and evaporation of the solvent, there are collected by distillation 46.5 g. of diallylamino-1-epoxy-2,3-propane the boiling point and index of refraction of which are:

$$B.P._{10}=78° C., n_D^{25}=1.4600$$

The calculated and found epoxy values are 0.653 and 0.65 respectively.

In a third stage, the epoxy derivative obtained is reacted with diallylamine. An equimolecular mixture of diallylamine and diallylamino - 1 - epoxy - 2,3 - propane in solution in acetone or methyl ethyl ketone is boiled in the presence of catalytic amounts of tertiary amines. After cooling and evaporation of the solvent, the reaction product is distilled under vacuum. The yield is 85%.

Thus, 153 g. of diallylamino-1-epoxy-2,3-propane (1 mole) and 97 g. of diallylamine (1 mole) in 100 cc. of methyl ethyl ketone are boiled for 15 hours in the presence of 2 g. of DABCO (diazabicyclo-octane). By distillation there are obtained 212 g. of bis (diallylamino)-1,3-propanol-2 the boiling point and index of refraction of which are:

$$B.P._{0.15}=90° C., n_D^{25}=1.4775$$

Analysis reveals the presence of one hydroxyl group for every 250 units of molecular weight, as the formula of the product makes it possible to predict.

It is possible to prepare bis(diallylamino)-1,3-propanol-2 by a faster method giving better yields by reacting the diallylamino-1-chloro-3-propanol-2 directly with diallylamine.

Preparation of the polyurethane

A Polyurethane G in accordance with the invention is prepared by using:

10 kg. of a mixed ethylene glycol and propylene glycol polyadipate of a molecular weight of 2,760;
294 g. of allyloxypropanediol;
74.1 g. of bis(diallylamino)-1,3-propanol-2;
1.48 kg. of diphenylmethane diisocyanate.

After homogenization and placing in an oven for 24 hours at 90° C., there is obtained a Polyurethane G of a molecular weight of 80,000 and of a Mooney ML (1+4) viscosity at 100° C. of 68. This Polyurethane G has approximately one intermediate ethylene unsaturation in the chain for every 5,000 units of molecular weight. At each end of the chain it has four double bonds connected two-by-two to a nitrogen atom. The molar proportions of the products used correspond approximately to 24 moles of polyester, 15 moles of allyloxypropanediol, 2 moles of nitrogen unsaturated compound and 40 moles of diisocyanate.

There is also prepared a control Polyurethane H in identical manner but by using, instead of bis(diallylamino) - 1,3 - propanol - 2, the equivalent molar quantity, namely 51 g., of diallyloxypropanol. There is obtained a control Polyurethane H whose structure differs from that of the Polyurethane G of the invention only by the presence of two terminal double bonds at each end of the chain not connected to nitrogen atoms instead of four terminal double bonds at each end of the chain connected to nitrogen atoms. The Mooney ML (1+4) viscosity at 100° C. is 55.

Preparation of the mixtures and vulcanization

The Polyurethanes G and H are used to prepare mixtures in accordance with the following formula (by weight):

| | |
|---|---|
| Polyurethane G or H | 100 |
| Stearic acid | 0.3 |
| SAF black | 25 |
| MBTS | 3.4 |
| MBT | 1.7 |
| MBZ | 0.6 |
| Sulfur | 1.7 |

The vulcanization is effected at 154° C. and its course followed up by means of a Monsanto rheometer. Mixture G has modulus of shear corresponding to 90% of its maximum value in only 12 minutes. In the case of mixture H, 27 minutes are necessary to achieve this result. At 134° C., mixture G reaches a modulus equal to 90% of the maximum in only 28 minutes, namely approximately the same length of time as for mixture H at 154° C. If the amount of MBZ is reduced, the vulcanization is longer, both in the case of mixture G and in the case of mixture H, and particularly in the case of the latter.

The properties of the vulcanized products are indicated below.

| | G | H |
|---|---|---|
| Modulus at 100% elongation kg./cm.$^2$ | 25.7 | 26.5 |
| ISO hardness | 75 | 73 |
| Hysteresis loss in percent: | | |
| At 20° C | 29 | 35.5 |
| At 60° C | 22.5 | 28.4 |
| Elongation at rupture in percent at 20° C | 670 | 653 |
| Rupture force in kg./cm.$^2$ at 20° C | 453 | 428 |
| Elongation at rupture in percent at 100° C | 800 | 605 |
| Rupture force in kg./cm.$^2$ at 100° C | 302 | 187 |

As can be noted, the vulcanizate of Polyurethane G in accordance with the invention has physical properties which are definitely better than those of the vulcanizate of control Polyurethane H even though vulcanized in a definitely shorter period of time. These improvements, both in the vulcanization kinetics and in the properties of the vulcanized products, are due to the different structure of the chain ends.

Sulfur vulcanizable unsaturated polyurethanes having at each end of the chain five ethylene double bonds can also be prepared, for example, by using penta-allyloxy dulcitol as the reactant having a single function which is reactive with isocyanates.

Many modifications of the representative embodiments described herein will readily occur to those skilled in the art. Accordingly, the invention is to be construed as including all such embodiments which fall within the scope of the appended claims.

I claim:

1. A sulfur-vulcanizable unsaturated polyurethane, characterized in that at each end of the chain there is a terminal moiety having at least three allyl groups therein.

2. The sulfur-vulcanizable unsaturated polyurethane defined by claim 1 wherein the polyurethane has at each end of the chain a terminal moiety having four allyl groups therein.

3. The sulfur-vulcanizable unsaturated polyurethane defined by claim 1 wherein the allyl groups are allyloxy, allylamino or mixtures thereof.

4. The sulfur-vulcanizable unsaturated polyurethane defined by claim 1 having a molecular weight W of from 40,000 to 100,000 and having a number $q$ of intermediate ethylenic unsaturations such that the density or interval $W/q$ between the intermediate ethylenic unsaturations is from 1,000 to 8,000 molecular weight units.

5. The sulfur-vulcanizable unsaturated polyurethane defined by claim 4 wherein the density or interval $W/q$ between the intermediate ethylenic unsaturations is from 3,000 to 6,000 molecular weight units.

6. The sulfur-vulcanizable unsaturated polyurethane defined by claim 1 wherein the terminal moieties are derived from triallyloxy pentaerythritol, triallyloxy hexane tetrol, tetra-allyloxy arabitol, penta-allyloxy dulcitol, diallylamino - 1 - allyloxy-3-propanol-2 or bis (diallylamino)-1,3-propanol-2.

7. The sulfur-vulcanizable unsaturated polyurethane defined by claim 6 wherein the terminal moieties are derived from trialloyloxy pentaerythritol.

8. The sulfur-vulcanizable unsaturated polyurethane defined by claim 6 wherein the terminal moieties are derived from triallyloxy hexane tetrol.

9. The sulfur-vulcanizable unsaturated polyurethane defined by claim 6 wherein the terminal moieties are derived from tetra-allyloxy arabitol.

10. The sulfur-vulcanizable unsaturated polyurethane defined by claim 6 wherein the terminal moieties are derived from penta-allyloxy dulcitol.

11. The sulfur-vulcanizable unsaturated polyurethane defined by claim 6 wherein the terminal moieties are derived from diallylamino-1-allyloxy-3-propanol-2.

12. The sulfur-vulcanizable unsaturated polyurethane defined by claim 6 wherein the terminal moieties are derived from bis(diallylamino)-1,3-propanol-2.

13. A sulfur vulcanizate of the sulfur-vulcanizable unsaturated polyurethane defined by claim 1.

References Cited

UNITED STATES PATENTS

| 3,135,716 | 6/1964 | Uraneck et al. | 260—45.5 |
| 3,036,045 | 5/1962 | Short et al. | 260—77.5 |
| 3,043,807 | 7/1962 | Snyder et al. | 260—75 |
| 3,100,759 | 8/1963 | Boussu et al. | 260—77.5 |
| 3,457,326 | 7/1969 | Kienle | 260—858 |
| 3,230,199 | 1/1966 | Muhlhausen et al. | 260—75 |

DONALD E. CZAJA, Primary Examiner

H. S. COCKERAM, Assistant Examiner

U.S. Cl. X.R.

260—77.5 AM